(12) United States Patent
Friedman

(10) Patent No.: US 7,636,793 B1
(45) Date of Patent: Dec. 22, 2009

(54) MULTIMEDIA DISTRIBUTION IN A HETEROGENEOUS NETWORK

(75) Inventor: Lee Friedman, Alpharetta, GA (US)

(73) Assignee: AT&T Intellectual Property I, LP, Reno, NV (US)

( * ) Notice: Subject to any disclaimer, the term of this patent is extended or adjusted under 35 U.S.C. 154(b) by 476 days.

(21) Appl. No.: 10/039,047

(22) Filed: Dec. 31, 2001

Related U.S. Application Data

(60) Provisional application No. 60/336,332, filed on Nov. 2, 2001.

(51) Int. Cl.
*G06F 15/16* (2006.01)

(52) U.S. Cl. .................................. 709/246; 709/228

(58) Field of Classification Search ................ 709/246, 709/223–232
See application file for complete search history.

(56) References Cited

U.S. PATENT DOCUMENTS

| | | | |
|---|---|---|---|
| 6,076,174 A | 6/2000 | Freund | |
| 6,151,632 A * | 11/2000 | Chaddha et al. | 709/231 |
| 6,167,445 A * | 12/2000 | Gai et al. | 709/223 |
| 6,185,625 B1 * | 2/2001 | Tso et al. | 709/247 |
| 6,212,190 B1 | 4/2001 | Mulligan | |
| 6,260,062 B1 | 7/2001 | Davis et al. | |
| 6,286,052 B1 * | 9/2001 | McCloghrie et al. | 709/238 |
| 6,405,254 B1 * | 6/2002 | Hadland | 709/230 |
| 6,539,427 B1 * | 3/2003 | Natarajan et al. | 709/224 |
| 6,594,699 B1 * | 7/2003 | Sahai et al. | 709/228 |
| 6,618,397 B1 * | 9/2003 | Huang | 370/474 |
| 6,693,912 B1 * | 2/2004 | Wang | 370/401 |
| 6,728,216 B1 * | 4/2004 | Sterner | 370/252 |
| 6,769,024 B1 * | 7/2004 | Natarajan et al. | 709/224 |
| 6,789,263 B1 * | 9/2004 | Shimada et al. | 725/119 |
| 6,810,409 B1 * | 10/2004 | Fry et al. | 709/202 |
| 6,822,940 B1 * | 11/2004 | Zavalkovsky et al. | 370/237 |
| 2002/0186660 A1 * | 12/2002 | Bahadiroglu | 370/248 |
| 2003/0055594 A1 * | 3/2003 | Bunker et al. | 702/134 |

OTHER PUBLICATIONS

Moutra et al. Retrieving quality video across heterogeneous network. Video over wireless.; Feb. 1996.*

* cited by examiner

*Primary Examiner*—Aaron Strange
(74) *Attorney, Agent, or Firm*—Larson Newman & Abel, LLP

(57) ABSTRACT

The efficiency of real-time distribution of multimedia content over a heterogeneous network is optimized by locally, rather than centrally, adapting the content to conform to the capabilities limitations of the network. Multimedia content travels from a central location along the network backbone. When received by each of a system of dispersed media servers, that media server adapts the content by compensating for any QoS limitations of the downstream network segments. For example, the backbone of the communications network may consist of a satellite uplink. The dispersed media servers receive and replicate the content as required for distribution to unicast segments downstream rather than doing so at the source of the content, and thus multiple streams of identical content need not be carried on the backbone. Each dispersed server is programmed to optimize the transmission to conform to the transmission parameters of each adjacent and downstream segment of the network.

5 Claims, 3 Drawing Sheets

MULTIMEDIA DISTRIBUTION IN A HETEROGENEOUS NETWORK

RELATED APPLICATION

This application claims priority to and incorporates by reference, U.S. Provisional Application Ser. No. 60/336,332 entitled "Multimedia Distribution In A Heterogeneous Network," filed on Nov. 2, 2001.

FIELD OF THE INVENTION

This invention relates generally to systems and methods for distributing media, and more particularly, to systems and methods for distributing multimedia content from a single source to multiple users on a heterogeneous network.

BACKGROUND

A heterogeneous network includes segments that are subject to varying distribution parameters such as bandwidth, latency, and jitter, as well as protocol and routing restrictions. Such parameters establish the level of performance of each network segment, commonly referred to as the "quality of service" (QoS). Heterogeneity of a network can create deficiencies in the broadcast quality of information simultaneously transmitted to disparate locations on the network, especially when contradictory network policies and QoS mechanisms are imposed. To achieve real-time distribution of multimedia over a heterogeneous network, the data must adapted so as to reach all intended recipients simultaneously, or in other words, such that the data is not delayed by any limitations imposed by the topology of the network. For example, simultaneous compression of the data may be required to compensate for low bandwidth of a particular network segment. However, compressing data on the fly can lead to unacceptable latency. Potential measures which address this latency include the utilization of special hardware or low efficiency compression algorithms, sacrificing resolution, reducing the frame size, or reducing the number of frames per second.

One approach to distributing content over a heterogeneous network is to format and to transmit multimedia content separately to each segment according to its QoS parameters. This approach is disadvantageous in that the bandwidth required to achieve simultaneous distribution increases according to the number of segments that have a different QoS. Another approach is to minimize the number of simultaneous transmissions by supporting a limited number of QoS levels, including a best-effort class. This approach is suggested in an article by Salgarelli et al, entitled "*Supporting IP Multicast Integrated Services in ATM Networks*." Proceedings of SPIE Voice&Video '97, Broadband Networking Technologies. Such an approach reduces the additional bandwidth consumed although at the expense of optimizing performance.

Each network segment may be subject to a different limitation, so the compensating measures that are appropriate for one segment are not necessary for another. The approaches discussed above require either a single scheme that compensates for the limitations of the network as a whole, or multiple simultaneous transmissions involving different compensations schemes. What is needed is a system of distributing multimedia content from a single source to multiple recipients located at various points in a heterogeneous network, that maximizes the capabilities of each recipient segment while minimizing the resources consumed at any one point on the network.

SUMMARY

This invention addresses the needs described above by providing systems and methods of distributing multimedia content over a heterogeneous network. The systems and methods of this invention optimize the distribution of multimedia content from a central source to multiple destinations along a heterogeneous network by transmitting multimedia content more efficiently, reliably and consistently, regardless of the distribution parameters of various segments of the network (e.g., unicast, or multicast).

More specifically, this invention permits a distribution of multimedia to be adapted locally to conform to the parameters imposed by each recipient network segment. In other words, rather than adapt the content at the source, the content is adapted by dispersed media servers that are located between the network backbone each recipient network segment. Accordingly, multimedia can be distributed along a network backbone such that the single distribution of multimedia can take full advantage of the capabilities of the network by being adapted to conform to network segments having the least restrictive limitations as well as to network segments having the most restrictive limitations. When the stream reaches a dispersed media server, that media server adapts the stream according to the topology of each segment that is downstream from that media server, and upstream from a segment endpoint (typically a recipient or other media server).

According to an exemplary embodiment of the invention, each media server is programmed to adapt data according to the distribution parameters of each network segment that is adjacent to and downstream from that media server. The system then transmits multimedia content from a central source to the programmed media server, which adapts the transmission, thereby yielding for example an advantageous reduction of the bandwidth consumed at the source upon transmission of the multimedia content. After a media server adapts the data, the media server transmits the data to any targeted recipients and media servers along the adjacent network segment or segments. Thus, the systems and methods optimize the distribution of multimedia content based upon the quality of service (QoS) parameters of targeted segments of a network at a given time. If segment parameters change, the dispersed media servers are reprogrammed to adapt to accommodate the new network parameters.

A second or subsequent dispersed media server may be located on a secondary or subsequent network segment downstream from a first dispersed media server that is located between the network backbone and a primary network segment. In other words, network segments may branch off to more network sub-segments. Each second or subsequent dispersed media server receives data that has been adapted by the preceding dispersed media server, and further adapts the data to conform to the parameters associated with the adjacent and downstream network segment or segments.

Other advantages and features of the invention will be apparent from the description below, and from the accompanying papers forming this application.

BRIEF DESCRIPTION OF DRAWINGS

The accompanying drawings, which are incorporated in and form a part of the specification, illustrate preferred embodiments of this invention and, together with the description, disclose the principles of the invention. In the drawings.

DETAILED DESCRIPTION OF THE EMBODIMENTS

1. Overview

Figure 1:
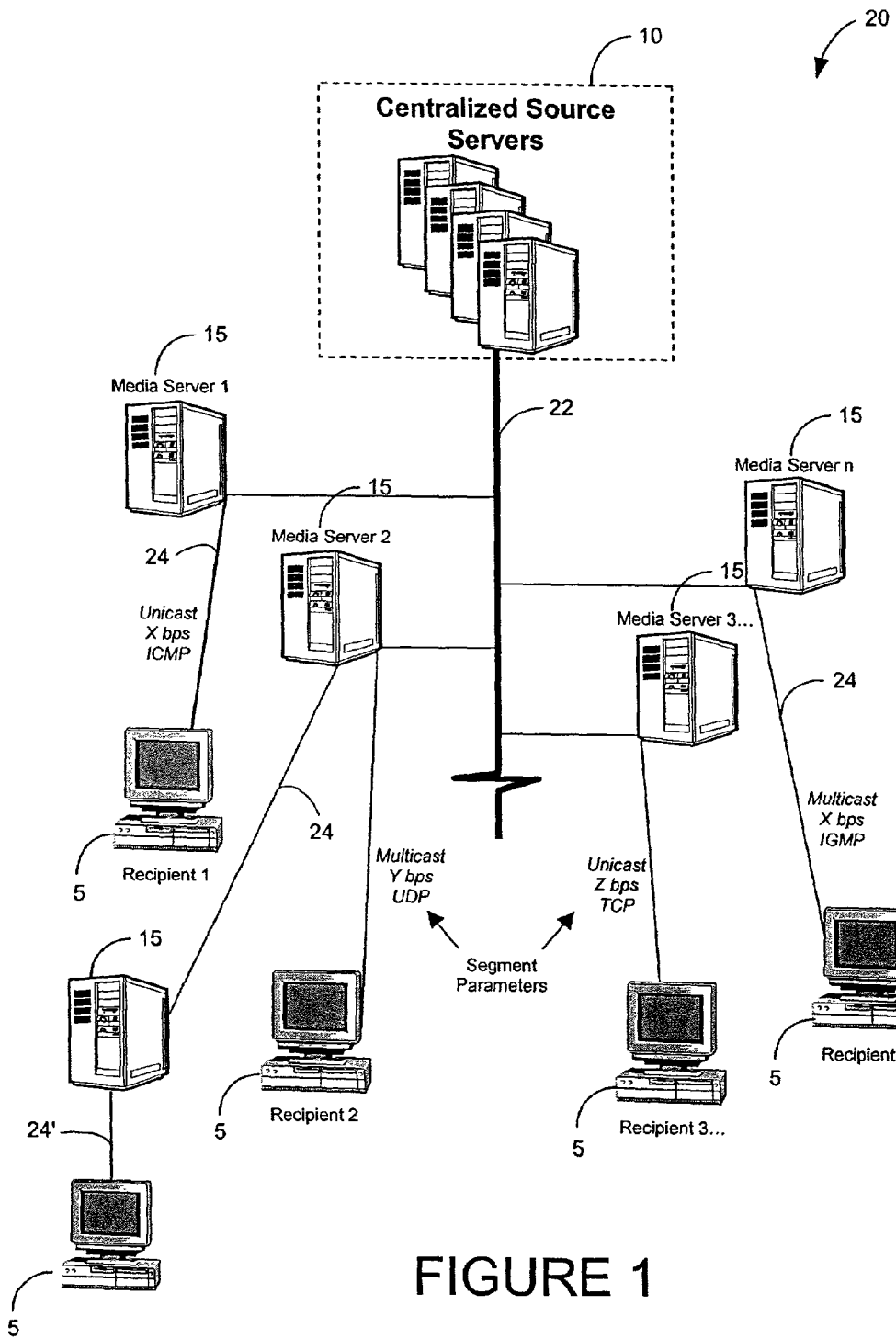
FIG. 1 is a diagram of a network according to one embodiment of the invention.

In an exemplary communications network 20 according to the invention, a central set of servers 10 provide a source of multimedia content. The central servers 10 are connected to a communications network 20 that includes multiple segments, any of which can branch off of a backbone 22 of the communications network 20. Media servers 15 are dispersed throughout the network 20 such that one media server 15 is positioned at the designated jumping-off point of each network segment 24, i.e., near the point at which the network segment 24 branches off from the backbone 22. Additional media servers 15 may be located at the heads of network sub-segments 24' that branch off from network segments 24 or other network sub-segments 24'. A hierarchy is formed at the top of which is the central source 10, followed by one or more tiers of dispersed media servers 15, and ending with multiple recipient devices 5.

A media server 15 is typically a file server on a local area network that contains files incorporating any combination of voice, images, pictures, video, or other media type. Each media server 15 is programmed to distribute multimedia content according to the distribution parameters of its adjacent segment or segments.

II. Exemplary Environment

In an exemplary embodiment of this invention, the communications network 20 is any type of system that transmits any combination of voice, video and/or data between targeted stations. The communications network 20 includes the transmission media (e.g., cables) and all supporting hardware (e.g., bridges, routers and switches), and can include antennas and towers. The network 20 can be comprised of a combination or combinations of network types (e.g., peer-to-peer or client/server), scales (e.g., local area network (LAN) or wide area network (WAN)), and physical and logical network constructions (topologies). Known network topologies include broadcast (network bus, or backbone), point-to-point electrical and optical repeater links (network ring), logical star, and hybrid combinations thereof. In an exemplary embodiment, the network 20 is composed of multiple sub-networks, and therefore has a hybrid topology.

III. Centralized Source Servers

Referring to FIG. 1, a set of centralized servers 10 is positioned at the source of the distribution of media content, hereinafter referred to as "source servers" 10. Each source server 10 can be a computer or other device that processes requests for media content.

Figure 2:
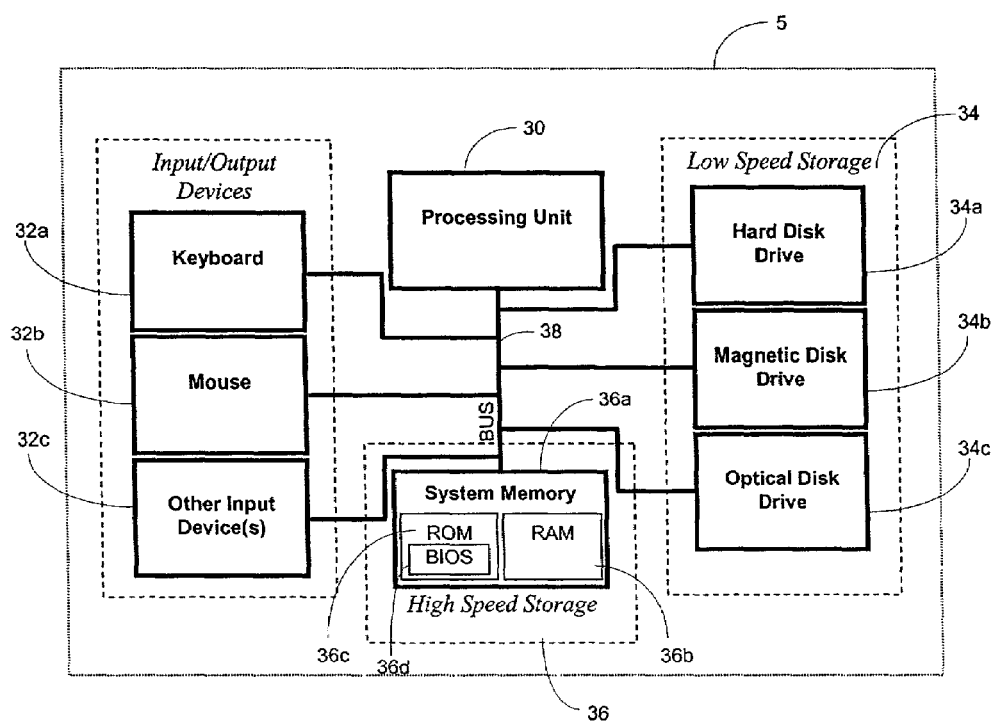
FIG. 2 is a block diagram of a user device according to one aspect of the invention.

As illustrated in FIG. 2, an exemplary source server 10 for implementing the inventions comprises a computer 10 including a processing unit 30, high speed storage 36 having system memory 36a, and a system bus 38 that couples the system memory 36 to the processing unit 30. The system memory 36 includes read only memory (ROM) 36c and random access memory (RAM) 36b. A basic input/output system (BIOS) 36d, containing the basic routines that help to transfer information between elements within the computer 10, such as during start-up, is stored in ROM 36c. The computer 10 further includes low speed storage 34, such as a hard disk drive 34a, a magnetic disk drive 34b, e.g., to read from or write to a removable disk, and an optical disk drive 34c, e.g., for reading a CD-ROM disk or to read from or write to other optical media. The hard disk drive 34a, magnetic disk drive 34b, and optical disk drive 34c include a hard disk drive interface, a magnetic disk drive interface, and an optical drive interface, respectively, for coupling the drives to the system bus 38. The drives 34 and their associated computer-readable media provide nonvolatile storage for the computer. Although the description of computer-readable medium above refers to a hard disk, a removable magnetic disk and a CD-ROM disk, other types or media readable by a computer, such as magnetic cassettes, flash memory cards, digital video disks, Bernoulli cartridges, and the like, can also be used.

A number of program modules can be stored in the drives and RAM, including an operating system, one or more application programs, a shared code library, and a property browser program module. A user may enter commands and information into the personal computer through a keyboard 32a and pointing device 32b, such as a mouse. Other input/output devices 32c can include a microphone, joystick, satellite dish, scanner, or the like. These and other input/output 32c devices are often connected to the processing unit through a serial port interface coupled to the system bus, but can be connected by other interfaces, such as a universal serial bus (USB). The input/output devices 32c include a monitor or other type of display device connected to the system bus 38 via an interface, such as a video adapter. In addition to the monitor, computers 10 typically include other peripheral output devices 32c, such as speakers or printers.

The source server 10 operates in a networked environment using logical connections to one or more media servers 15, and potentially, to recipient computers 5. Media servers 15 typically include many or all of the elements described in the source server 10. Each media server 15 is connected to one or more recipient computers 5. Each media server 15 may be connected to one or more other media servers 15 as well.

The recipient computers 5 can be any type of device, including but not limited to set-top boxes such as WebTV™, enhanced televisions or any other type of interactive television, desk-top computers, lap-top computers, Palm Pilot, PocketPC, Visor or any other type of Personal Digital Assistants, Internet appliances, data devices, any type of communication device, hand-held units, multiprocessor systems, microprocessor systems, minicomputers, mainframe computers, and the like. Each recipient computer 5 can include a memory storage device, which can include stored program modules that are executable by the media server 15. The logical connections include a local area network (LAN) and a wide area network (WAN).

When used in a LAN networking environment, the recipient computer 5 is connected to the LAN through a network interface. When used in a WAN networking environment, the recipient computer 5 typically includes a modem or other means for establishing communications over the WAN, such as the Internet. The modem, which can be internal or external, is connected to the system bus via the serial port interface. In a networked environment, program modules depicted relative to the personal computer, or portions thereof, can be stored in the remote memory storage device. The network connections are exemplary and other means of establishing a communications link between the recipient computer 5 and the network 20 can be used.

In the exemplary embodiment, each media server 15 includes a console or other user interface that enables an administrator to specify the parameters of each segment of the network 20. The segment parameter data used to program the appropriate dispersed media servers 15 represents the data transfer capabilities and limitations each adjacent and downstream network segment 24 or 24'. The segment parameter data changes as the topology of a network segment 24 or 24' changes, so the appropriate media server must be reprogrammed along with each network reconfiguration.

IV. Network Segments

In the exemplary embodiment, the communications network 20 includes multiple segments. The segments can differ possibly due to disparate network technologies, and thus is subject to different parameters, such as bandwidth restrictions, communications protocols, and routing restrictions. Bandwidth, commonly expressed in bits per second (bps), represents the transmission capacity of a communications network. For example, the bandwidth of an unswitched private TI segment is 1.6 Mbps, while the bandwidth of an OC48 ATM segment can exceed 2488 Mbps.

Each network segment 24 or 24' is an electronically continuous portion of the network 20, which jumps-off from the backbone 22 or from another network segment 24 or 24' and is headed by a media server 15. As an example, the backbone 22 of the network 20 can consist of a satellite uplink. Dispersed media servers 15 download data from the backbone 22, and relay the data along unicast and multicast network segments 24 located downstream. The data is received by recipients 5 and/or other media servers 15, which further adapt and relay the data along more unicast and multicast network segments 24' located downstream, and so on.

Accordingly, each network segment 24 or 24' can be governed by varying rules governing the transmitting and receiving of data, commonly referred to as protocols. Examples of protocols include Internet Control Message Protocol (ICMP), User Datagram Protocol (UDP), Transmission Control Protocol (TCP), and Internet Group Management Protocol (IGMP). Some communications networks have the capability of sending "one-to-many" transmissions of content to multiple intended recipients (multicast), while others can only "unicast" which requires an individual transmission for each intended recipient.

Each network segment 24 or 24' can also be subject to different routing parameters. Routers typically use mathematical formulae, known as routing protocols, to determine which of several available paths is the most expedient path along which to forward a stream of transmitted data packets to a final destination. The routers can consider network characteristics such as traffic, speed, and economics to optimize the data path. Commonly, route servers process this information, which is then passed on to the routers, thereby allowing the routers to focus only on forwarding the stream of data packets accordingly. Routers also replicate transmissions as required depending upon whether the transmissions will be forwarded onto unicast or multicast segments.

To achieve distribution of multimedia content while maintaining a consistent quality of service (QoS), an architecture of centralized source servers 10 coupled with dispersed media servers 15 or similar distribution means adapts the distributed media content to the varying parameters of the intended network segments 24 or 24'.

V. Dispersed Media Server Architecture

As illustrated in FIG. 1, the network 20 includes media servers 15 that are dispersed throughout the communications network 20, optimally being positioned at the head of each network segment 24 or 24'. Each media server 15 is programmed to adapt multimedia content according to the parameters of each intended segment 24 or 24' that is adjacent to and downstream from the media server 15.

When a source server 10 receives a request for multimedia content to be distributed, it transmits the multimedia content to all intended media servers 15. Each media server 15 then transmits the multimedia content to intended recipients 5 and other media servers 15 that are downstream from that media server 15, while first adapting the multimedia content according to the parameters of each intended segment 24 or 24'.

As an example, in the absence of this invention a separate stream of data packets typically must be created, addressed, and forwarded for each recipient 5 on a unicast segment of the network 20. Thus, at the source of the transmission, copies must be made of the stream of data packets before transmission. If synchronized reception on a unicast network is intended, the source must transmit the copies of the stream of data packets simultaneously, thereby increasing bandwidth consumed several fold. For each multicast network segment to which the network is interconnected and to which transmission is intended, a router addresses and forwards a copy of the stream of data packets. Disadvantageously, a source that intends synchronized reception by destinations located on both unicast and multicast segments of a heterogeneous network must simultaneously transmit the single stream of data packets for the multicast segments along with an additional copy of the stream of data packets for each unicast destination.

According to this invention, media servers 15 are programmed to receive a stream of data packets, and to forward the stream of data packets to the intended segments of the network 20 after adapting the stream of data packets according to parameters of each intended segment 24 or 24'. For example, if the packet size of the stream exceeds the maximum transmission unit (MTU) of a particular network segment 24 or 24', the programmed media server 15 adapts the data such as by adjusting the packet size or implementing a compression mechanism. The programmed media server 15 can also translate the protocol of the stream according to the protocol requirements of the network segment 24 or 24'. The programmed media server 15 transmits the stream of data to recipients or other media servers 15 according to bandwidth, routing, and other characteristics of each downstream network segment 24 or 24' that is targeted by the transmission. The media server 15 ensures replication of the multimedia stream as needed, and forwards the multimedia stream to the intended recipients 5.

In an aspect of this invention, each media server 15 is programmed typically either locally or remotely by a network administrator (which may be a person or another device), such that the media server 15 contains instructions for adapting data to conform to the QoS parameters of each network segment 24 or 24' that is downstream from and located between that media server 15 and at least one recipient 5 or other media server 15. The programming can be updated whenever a change in the QoS parameters of a network segment 24 or 24' occurs. Preferably, a network administrator will proactively reprogram the appropriate media server or media servers 15 whenever the network 20 is reconfigured. Alternatively, changes in QoS parameters can be detected by the media server 15 and transmitted to the administrator. Upon detecting such a change, the media server 15 can request new programming from the administrator. As another alternative, the administrator can check each media server 15 periodically to identify whether network topology has changed or parameters and therefore requires new programming. New programming for that media server 15 is generated according to the changed parameters.

Figure 3:
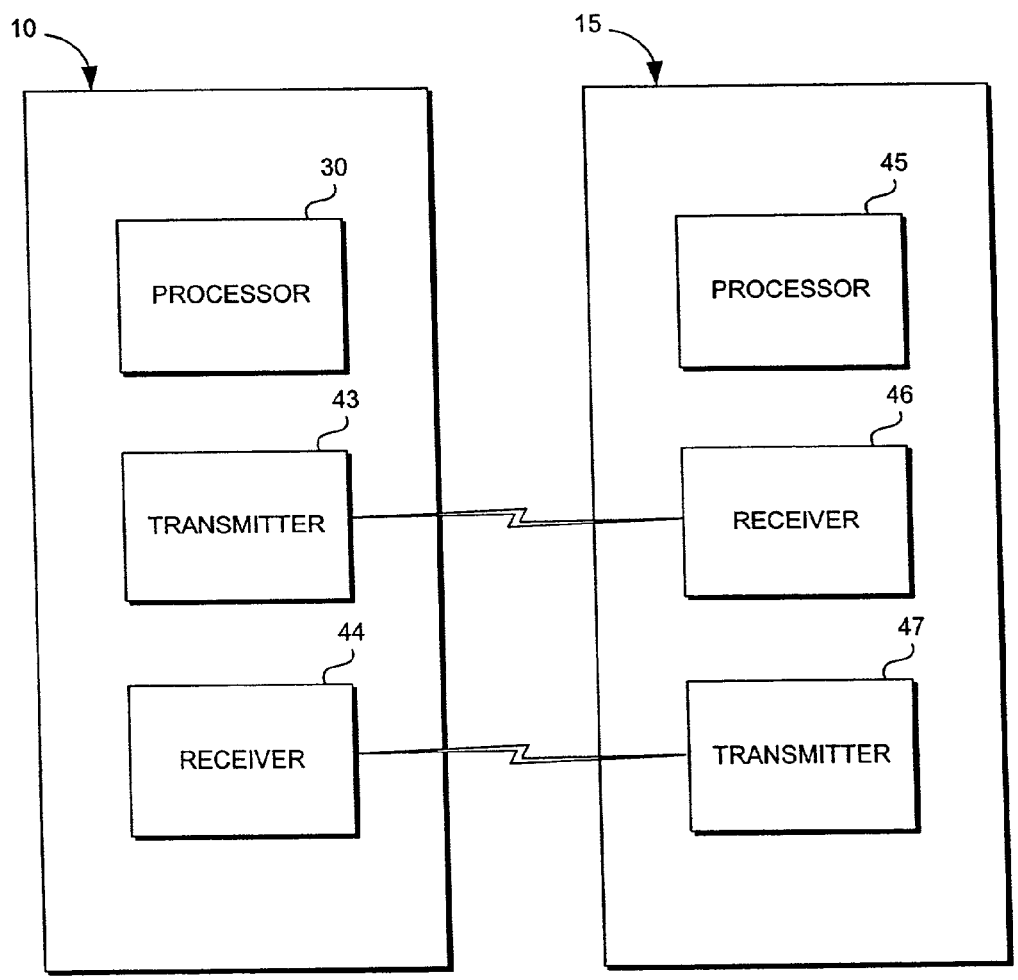
FIG. 3 is a block diagram of components of a remote server and a dispersed media server.

FIG. 3 is a block diagram of a source server 10 and a dispersed media server 15. The source server 10 includes a processor 30 that implements programmed instructions to adapt data to conform to transmission parameters of backbone 22 that is downstream from the source server 10. The source server 10 also includes a transmitter 43 that sends information to each dispersed media server 15, and a receiver 44 that receives information from the network administrator. The dispersed media server 15 includes a processor 45 that implements programmed instructions generated by the administrator. A receiver 46 receives information sent to the media server 15 from the administrator, the source server 10, or from another media server 15. A transmitter 47 sends information, such as the transmission parameters, to the administrator.

The foregoing description of the preferred embodiments of the invention has been presented only for the purpose of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated.

What is claimed is:

1. A method executed by multiple dispersed file servers for adapting data received from a remote sending device in a single heterogeneous network according to quality of service parameters associated with a plurality of network segments that are downstream from the dispersed file servers, the method comprising:

receiving at the dispersed file servers instructions, wherein the instructions instruct the dispersed file servers to adapt the data;

receiving the data from the remote sending device;

adapting the data to conform to quality of service parameters associated with each network segment downstream from one of the dispersed file servers therein adapting the data at the dispersed file servers rather than adapting the data at the remote sending device wherein the dispersed file servers are located between the remote sending device and the plurality of network segments in the single heterogeneous network, the single heterogeneous network comprising a plurality of sub-networks, the plurality of sub-networks comprising a combination of peer-to-peer and client/server network types, a combination of local and wide area networks, and a hybrid combination of physical and logical network constructions, the physical and logical network constructions including broadcast, network bus, network ring, and logical star constructions, wherein the data is adapted by changing the protocol and by implementing a compression mechanism in response to a determination that packet size of the data exceeds a maximum transmission unit (MTU) of each network segment;

transmitting the adapted data along each network segment to one of a plurality of segment endpoints wherein the segment endpoints comprise at least one recipient client and at least one sub-segment dispersed file server that further adapts the data previously adapted to conform the data according to quality of service parameters associated with a network sub-segment adjacent to and downstream from the at least one of the plurality of segment endpoints comprising the sub-segment dispersed file server;

detecting a change in the quality of service parameters associated with at least one of the plurality of network segments; and requesting new programming for adapting the data from an administrator upon detecting a change in the quality of service parameters;

wherein values for the quality of service parameters vary among the plurality of network segments.

2. The method of claim 1, wherein adapting the data further comprises replicating the data.

3. The method of claim 1, further comprising transmitting the quality of service parameters from the file server to a network administrator.

4. A computer readable medium having stored thereon executable code which causes a file server to perform a method of adapting data according to a set of parameters associated with a network segment that is downstream from the file server, the method comprising:

receiving at the file server instructions, wherein the instructions instruct the file server to adapt the data;

receiving the data from a sending device;

adapting the data to conform to a set of quality of service parameters associated with a network segment downstream from the file server in a single heterogeneous network comprising a plurality of sub-networks, the plurality of sub-networks comprising a combination of peer-to-peer and client/server network types, a combination of local and wide area networks, and a hybrid combination of physical and logical network constructions, the physical and logical network constructions including broadcast, network bus, network ring, and logical star constructions, therein adapting the data at the device rather than adapting the data at the sending device, wherein the data is adapted by changing the protocol and by implementing a compression mechanism in response to a determination that a packet size of the data exceeds a maximum transmission unit (MTU) of the network segment;

translating a protocol of the data according to protocol requirements of the network segment;

transmitting the adapted data along the network segment to a sub-segment file server;

further adapting the adapted data at the sub-segment file server to conform according to a second set of quality of service parameters associated with a network sub-segment adjacent to and downstream from the sub-segment file server;

transmitting the adapted data along the network sub-segment to a client; and requesting new programming for adapting the data from an administrator upon detecting changes in the quality of service parameters for the network segment;

wherein values for the quality of service parameters vary among each network segment.

5. The computer readable medium of claim 4, wherein adapting the data further comprises replicating the stream of data.

* * * * *